Feb. 9, 1971 G. GOULD ET AL 3,562,662
LASER UTILIZING COLLISION DEPOPULATION
Original Filed Jan. 18, 1965 5 Sheets-Sheet 4

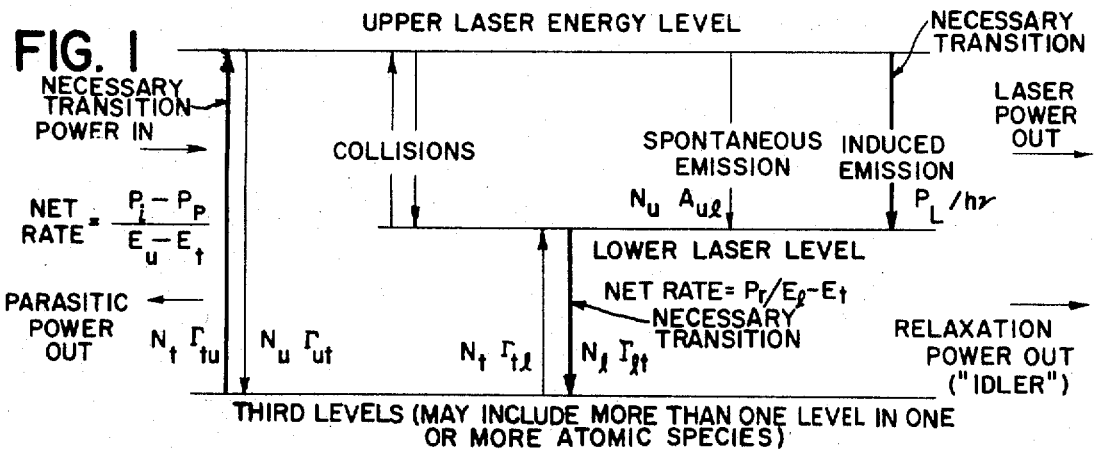
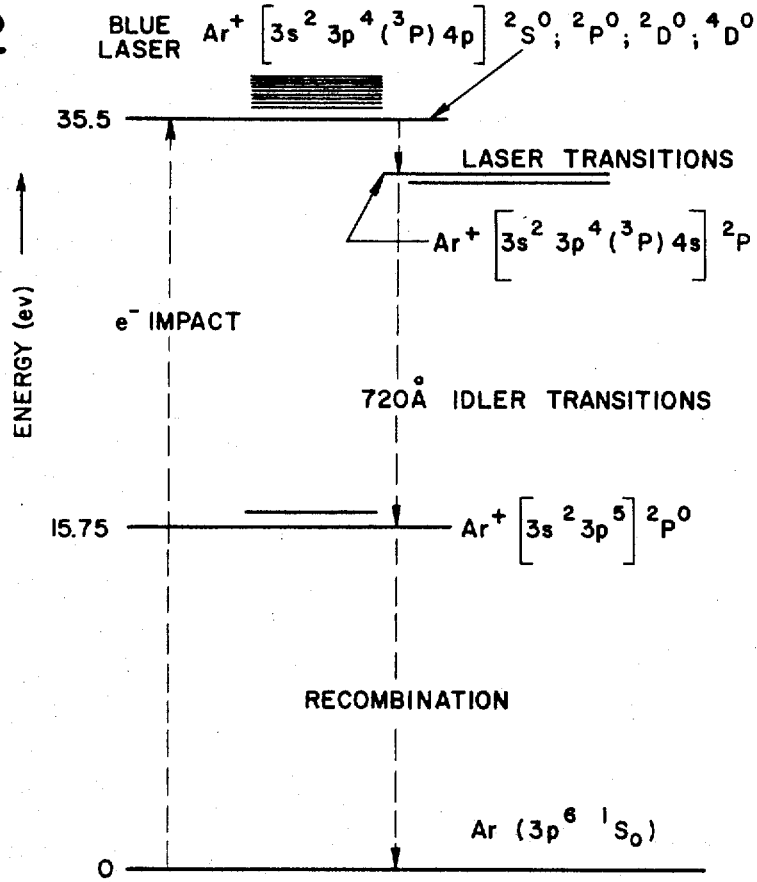

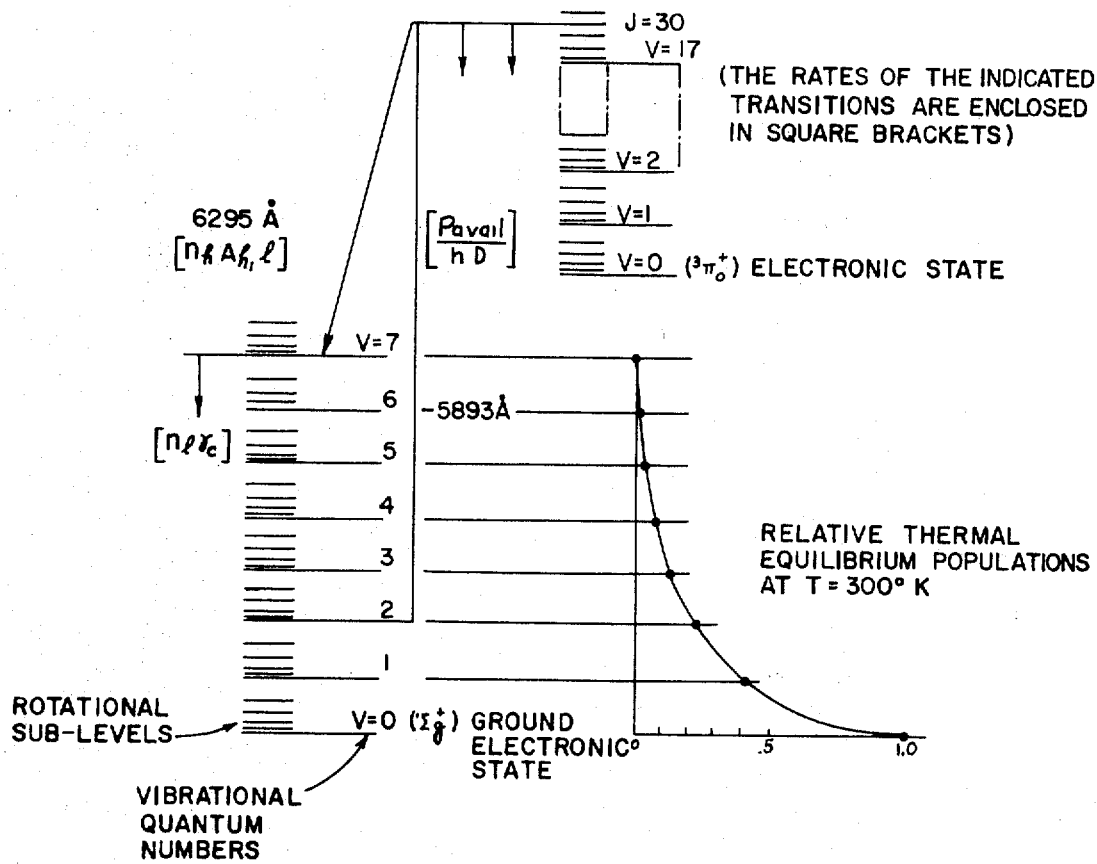

United States Patent Office 3,562,662
Patented Feb. 9, 1971

3,562,662
LASER UTILIZING COLLISION DEPOPULATION
Gordon Gould, New York, N.Y., and William Ralph Bennett, Jr., New Haven, Conn., assignors, by mesne assignments, to Gordon Gould, New York, N.Y.
Original application Jan. 18, 1965, Ser. No. 426,082. Divided and this application Feb. 1, 1966, Ser. No. 524,210
Int. Cl. H01s 3/02, 3/14, 3/22
U.S. Cl. 331—94.5                   7 Claims

ABSTRACT OF THE DISCLOSURE

In lasers according to the present invention a judicious combination of inelastic electron-atom and atom-atom collisions for excitation and relaxation maintains a population inversion for atoms of the laser medium without reliance on spontaneous emission. This is possible because transfer rates between levels due to atom-atom collisions are small if the energy defect substantially exceeds the average kinetic energy. Thus collisions with other atoms can selectively relax the lower level to other nearby levels without reducing the upper level population. Since there is no reliance on spontaneous emission, operation in the lower region of the energy level structure is possible with inherently greater efficiency. Laser power of the order 1 watt/cm.$^3$ with an efficiency greater than 10% is realizable.

This application is a division of Ser. No. 426,082, filed Jan. 18, 1965.

The present invention relates to lasers employing collisions rather than spontaneous emission to depopulate the lower laser level and more particularly to such lasers having a partially forbidden low-level laser transition.

In common lasers, particularly the gas discharge type, reliance on spontaneous emission either directly or indirectly to relax the lower level limits the efficiency and the power output from gas discharge lasers. Among the causes of such efficiency limitations is that the level spacing required for an untrapped radiative cascade places the laser levels well up in the energy level structure. The consequence is low quantum efficiency, a small fraction of electrons with the necessary energy for excitation, and parasitic loss through excitation of lower levels.

In lasers according to the present invention a judicious combination of inelastic electron-atom and atom-atom collisions for excitation and relaxation maintains a population inversion for atoms of the laser medium without reliance on spontaneous emission. This is possible because transfer rates between levels due to atom-atom collisions are small if the energy defect substantially exceeds the average kinetic energy. Thus collisions with other atoms can selectively relax the lower level to other nearby levels without reducing the upper level population. Since there is no reliance on spontaneous emission, operation in the lower region of the energy level structure is possible with inherently greater efficiency. Laser power of the order 1 watt/cm.$^3$ with an efficiency greater than 10% is realizable.

Temperatures above 1000° C. are needed to produce a monatomic gas of many of the elements with suitably spaced low-lying levels for lasers according to the present invention.

Accordingly it is an object of the present invention to provide laser systems of the class where efficiencies are achievable which are much higher than previously known efficiencies for conversion of electrical energy into coherent light energy.

Other objects and advantages will be apparent from a consideration of the following description in conjunction with the appended drawings in which:

FIG. 1 is an energy diagram of a generalized three-level laser useful in explaining the principles of the present invention;

FIG. 2 is an energy level diagram of argon I and II useful in explaining the limitations of previous lasers and the advantages of lasers according to the present invention;

FIG. 9 is an energy level diagram of the iodine molecule useful in explaining the mechanism of collision depopulation of lower laser levels which is a characteristic of lasers according to the present invention.

Figure 3:
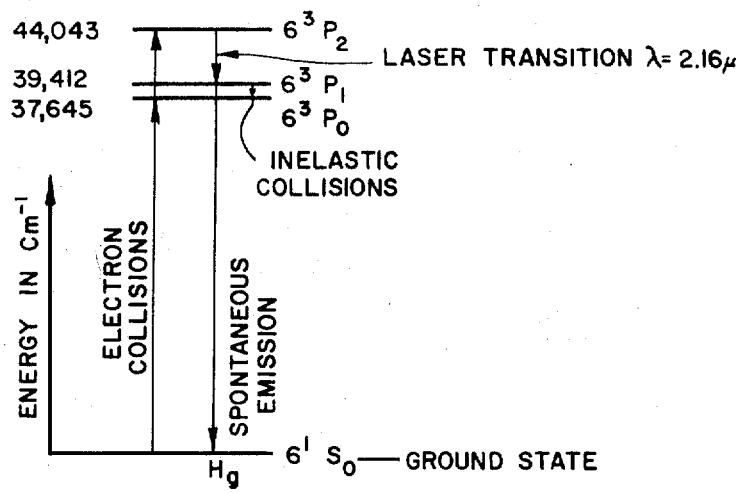
FIG. 3 is an energy level diagram of the mercury atom useful in explaining the techniques by which lasers according to the present invention achieve high efficiency.

In the explanation which follows the terms laser and light amplifier will be used interchangeably to refer to apparatus making use of the phenomenon of light amplification by stimulated emission of radiation.

A general discussion of theoretical considerations relating to the invention is useful before considering specific illustrative forms of laser apparatus according to the invention.

No gas discharge laser converts input to output power with an efficiency greater than 0.001. This poor performance is to be expected if the energy of excitation to the upper laser level is much greater than the laser photon energy. Unfortunately this must be the case if spontaneous emission is to depopulate the lower level. In contrast relaxation by inelastic atom-atom collisions makes possible the use of laser levels lying just above the ground level. Thus a combination of inelastic electron-atom and atom-atom collisions for both excitation and deexcitation is the key to an efficiency power gas laser.

The processes which occur in a gas laser are depicted schematically in FIG. 1. It may be shown from FIG. 1 that an efficient discharge laser must consider media quite different from those in vogue.

In common laser systems the spontaneous decay rate of the excited level is $>10^6$/sec., characteristic of "allowed" electric dipole radiative transistions. Since the excitation rate is of the order of $10^5$/sec. even using the efficient and selective method of collisions of the second kind, the excited level population could not be made greater than the ground level. Thus light amplifier action or emission by mutually-induced transitions occurs only to an intermediate level whose population is kept lower by an even faster rate of spontaneous decay.

It is also possible to depopulate a longer lived lower level by collisions of the second kind. This technique together with other techniques according to the present invention makes possible vastly improved efficiency.

This situation is in contrast to that of the maser. For levels spaced only by $E=h\nu$ where $\nu$ is a microwave frequency, E is the energy spacing between levels, and $h$ is Planck's constant, the thermal equilibrium population of the excited level is high and the lifetime is long. Therefore, the population of the excited level is easily maintained above that of the ground level.

In the case of levels sufficiently high above ground for optical transitions, the initial population will always be low. But if the levels are long-lived (metastable), it is readily possible to populate them at a rate greater than the natural decay rate or relaxation rate, and hence to maintain a higher population of atoms in the higher state.

Many of the elements which exist as single atoms in the gaseous state do not have high vapor pressures at convenient temperatures. Therefore, such of those which may possess metastable states have not heretofore been used in exciting other atoms by collisions of the second kind. It is more attractive to use such atoms as working atoms as described above. For this purpose the pressure (and temperature) may be lower. Most of these metastable levels are listed in Table 2.

As an example, consider the case of zinc. The metastable $4^3P$ levels lie about 4 electron-volts above ground. These levels do not lie close to any other metastable levels and so cannot be excited directly by collisions of the second kind. However, higher, non-metastable levels of Zn, can be excited by collisions with metastable krypton and xenon. From these levels the Zn atoms decay rapidly to the metastable levels as well as the ground level.

The rate of decay of $Zn(4^3P_1 \rightarrow 4'S_0)$ by emission of the ultraviolet photon, $\lambda=3076$A., is $A=1\times 10^5$/sec. It has already been mentioned that rates of collision excitation somewhat greater than this may be achievable. Therefore, it appears feasible to generate light amplifier transitions directly to the ground level with zinc.

Thallium is another case where the basic technique of use of long-lived metastable upper levels is applicable, most of the atoms may be pumped into the much longer lived $6^2P_{3/2}$ metastable level by a similar indirect mechanism: either collisions of the second kind with Hg metastables or absorption of the 3776 A. resonance radiation with subsequent decay to $6^2P_{3/2}$.

Referring again to FIG. 1, when bound electrons in a pair of levels with statistical weights, $g_a$ and $g_b$, are in thermal equilibrium at a temperature, T, there is no net population transfer, so that $$N_a\Gamma_{ab}=N_b\Gamma_{ba} \qquad (1)$$

The population densities in a Boltzmann distribution, are related by $$\frac{N_a}{g_a}=\frac{N_b}{g_b}[e]^{-(E_a-E_b)/kT} \qquad (2)$$

and the transfer rates per atom in the initial level by $$g_b\Gamma_{ba}=g_a\Gamma_{ab}[e]^{-(E_a-E_b)/kT} \qquad (3)$$

where $e$ is the base of natural logarithms; $E_a$ and $E_b$ are the energies of the $a$ and $b$ levels respectively; $k$ is the Boltzmann constant; and T is the temperature.

In the positive column of a discharge at moderate atom density ($N\sim 10^{16}$cm.$^{-3}$), a roughly Maxwellian free electron distribution obtains. Under these circumstances Equation 2 states that a population inversion cannot result from electron collisions alone. The net effect of transfers between the laser levels due to electron collisions is to reduce the excess population in the upper level. Therefore a different, selective, process must relax the lower level, or fill the upper level, or both. Some possible processes are indicated in Table 1.

In a continuously operating system the number of electrons bound in active atoms, ions or molecules is conserved. Therefore, both the number of excitations to the upper level and the number of relaxations from the lower must, on the average, exceed the number of photons emitted at the laser wavelength. Using symbols defined in FIG. 1 which is a generalized energy diagram of a three-level laser $$\sum_t(N_t\Gamma_{tu}-N_u\Gamma_{ut})>N_uA_{ul}+P_L/h\nu_L \qquad (4)$$

and $$\sum_t(N_l\Gamma_{lt}-N_t\Gamma_{tl})>N_uA_{nl}+P_L/h\nu_L \qquad (5)$$

A is the spontaneous emission rate per atom and $P_L$ is the laser power.

That is, for every photon coherently radiated at least one atom must be raised in energy from a third or "reservoir" level to the upper laser level, and energy must be lost from the system by the relaxation of at least one atom from the lower laser level to the reservoir. The "quantum efficiency" of a three-level laser obeys the inequality, $$\text{efficiency} < h\nu_L/E_u-E_t \qquad (6)$$

where $\nu_L$ is the laser frequency; $E_u$ is the energy of the upper level; and $E_t$ is the energy of the third level.

If the transition processes were all radiative, this would be the quantum equivalent of a Manley-Rowe relation.

The extreme case of the argon ion lasers shows the importance of this limitation (the energy diagram for which is shown in FIG. 2). If excitation is from the ground level of the neutral atom, even the theoretical maximum efficiency cannot exceed 5%; if from the ion ground level, it is less than 10%. It follows that the active "third levels" must be close to the laser levels in an efficient three-level laser.

If the atoms were cycled strictly along the pathway indicated by the heavy arrows in FIG. 1, the efficiency could approach the right side of inequality (6). Actually in existing lasers only a small fraction, $f$, of the atoms excited from the reservoir finds it way through the laser transition. The bulk of the energy acquired from the plasma electrons is lost through parasitic excitation and relaxation of other levels which lie near or below the upper laser level. These losses are symbolized by the terms $N_u\Gamma_{ut}$ and $N_t\Gamma_{tl}$ in inequalities (4) and (5). Inequality (6) must be modified to $$\text{efficiency} \simeq f(h\nu_L/[E_u-E_t]) \qquad (7)$$

In a discharge laser with one active component (e.g., xenon) in which the upper level is directly excited by electron collisions, undesired excitations cannot be avoided. The lower laser level at least must also be directly excited by electron collisions. The rate of transfer from level $b$ to level $a$ by collisions can be expressed by the general form $$\Gamma_{ba}=N\bar{\sigma}_{ba}\bar{v} \qquad (8)$$

where $\bar{\sigma}_{ba}$ is the average cross-section for transfer by collision from level $b$ to level $a$.

It has been suggested that an energy level structure may exist such that cross-section, $\sigma$, for electron excitation to the lower laser level is less than to the upper. This might be the case if the transition is optically forbidden. However, the average cross-section contains a Boltzmann factor, in conformity with Equation 3, which strongly favors excitation of a lower level.

The argon ion laser again provides an example. It is estimated that the average cross-section for ionization directly to the upper laser level is less than 0.01 of that to the ion ground level. Another branching factor of 0.1 arising within the configuration of the laser levels, and in useless excitation of the neutral argon levels, together with the quantum efficiency 10% is sufficient to account for an overall efficiency less than 0.01%.

It is of interest to consider a molecular gas laser system. In such a system the conventional light amplifier process cannot practically be used, i.e. excitation to a high electronic level with light amplifier emission to an intermediate level whose population is kept low by rapid spontaneous decay to a ground level. Instead the properties of molecules require and permit another mechanism for keeping the lower level population lower than some higher level population. This mechanism is relaxation of the lower level population by collisions of the second kind.

To exemplify the whole process, the molecule $I_2$ is considered (see FIG. 9).

The first member of the sodium principal series at 5893 A. coincides with one of the numerous absorption lines of the iodine molecule. One transition of interest therefore is from a rotational sublevel of the $v=2$ vibrational level of the ground electronic state $$\left({}^1\Sigma_g^+\right)$$

up to the $J=30$, $v=17$ sublevel of the $(3\pi_0^+)$ state. The $v=2$ of $$\left({}^1\Sigma_g^+\right)$$

levels are well populated in thermal equilibrium at room temperature (see lower right corner of FIG. 9), while $v=7$ of $$\left({}^1\Sigma_g^+\right)$$

has less than 1% of the population and $v=17$ of $(3\pi_0^+)$ has none.

A 1 cm. thick layer of $I_2$ vapor at a few mm. Hg. pressure absorbs most of the Na light and raises $I_2$ molecules to the upper level at a rate $$\frac{dn}{dt} = \frac{P_{avail}}{h\gamma} \quad (8a)$$

where $P_{avail}$ is the available power.

In the absence of light amplifier action, the atoms decay at a rate $$\frac{dn}{dt} = nh[\gamma_c + \Sigma A \text{ (all other states)}]$$

where $\Sigma A \equiv$ spontaneous radiative decay rate. $\gamma_c \equiv$ rate of removal by relaxation collisions with other $I_2$ molecules (quenching collisions). The cross-section for these collisions is very high since many $I_2$ states are closely spaced in energy. About 5% of the molecules decay to $v=7$ of $$\left({}^1\Sigma_g^+\right)$$

Then by the same method of decay as that first described herein, the dynamic equilibrium rates of population change are $$\frac{dn_h}{dt} = 0 = \frac{P_{avail}}{h\nu} - n_h(\gamma c + \Sigma A) \quad (8c)$$

$$\frac{dn_l}{dt} = 0 = n_h A(u \to l) - n_l \gamma_c \quad (8d)$$

and $$n_h = \frac{P_{avail}}{h\nu(\gamma_c + \Sigma A)} \quad (8e)$$

$$\frac{n_h}{n_l} = \frac{\gamma_c}{A(u \to l)} \quad (8f)$$

A $(u \to l)$ is the spontaneous radiative transition rate per/atom from the upper to the lower state.

It is to be noted that atoms can be removed from $v=7$ of $({}'\Sigma g+)$ only by relaxation collisions to other sublevels of the ground electronic state. Then if the $I_2$ pressure ($\sim 5$ mm. Hg) is such that $$\gamma_c \approx \Sigma A_u \approx 2_{OA}(u \to l) \approx 10^7/\text{sec} \quad (8g)$$

then $$n_h/n_l \approx 20 > 1 \quad (8h)$$

which is sufficient for light amplifier action.

The required Na(5893 A.) intensity from a discharge lamp arranged as a jacket is $$I \geq 10^{-3} \text{ watts/cm.}^2 \text{ steradian} \quad (8i)$$

The intensity in the first line of the Na principal series can easily be made greater than 0.1 watts/cm.$^2$ steradian, with a factor of 100 to spare.

It should be noted also, the use of laser transitions in molecules, with their multiplicity of levels, must almost inevitably entail a low branching factor, $f$. An efficient discharge laser should not contain a high density of molecules.

The inefficiency of existing lasers is basic and not merely coincidental. The requirement of rapid relaxation from the lower laser level limits the two factors in Equation 7. The minimum relaxation rate, $\Gamma_{min}$ (relaxation), of an excited level due to diffusion to the wall or the various inelastic collision processes is of the order;

$$\Gamma_{min}(\text{relaxation}) \simeq 10^4 \text{ sec.}^{-1} \quad (9)$$

A rate this small is possible only if the laser transition is optically forbidden in first order. In order to channel the excitation energy efficiently through the laser transition, the rate of induced transitions must be at least an order of magnitude larger, $$\frac{P_L}{N_u h\nu} > 10^5 \text{ sec}^{-1} \quad (10)$$

To maintain a population inversion, the relaxation rate from the lower level must be still faster, say $$\Gamma_{lt} \gtrsim 10^6 \text{ sec.}^{-1} \quad (11)$$

Table 1 below shows two sufficiently fast and selective mechanisms: Spontaneous radiative decay and inelastic collisions with atoms.

TABLE 1.—POSSIBLE EXCITATION AND RELAXATION MECHANISMS IN LOW DENSITY PLASMAS

| Transitions of bound electrons between energy levels in atoms or ions are caused by these processes— | Order of magnitude rates per atom in initial state at a pressure of 1 mm. hg— |
|---|---|
| (a) creation and annihilation of photons; induced emission; absorption; spontaneous emission | $<10^8$ sec.$^{-1}$ |
| (b) collisions with free electron | $<10^5$ at 1.0 amp/cm.$^2$ |
| (c) inelastic collisions with atoms or molecules | $<10^7$ |
| (d) diffusion to the walls | $<10^4$ |
| (e) ionization and deionization | $<10^4$ |
| (f) dissociation of molecules | |
| (g) recombination into molecules | $<10^5$ |

Metastable levels may be used to excite levels of nearly the same energy in other atoms by collisions of the second kind, examples of which are given in Table 2. These levels are long-lived because the electric dipole selection rules prohibit decay via rapid radiative process to any lower level. Metastable levels are listed only for atoms which normally form a monatomic gas though others could possibly be utilized. The alkaline earth elements, Zn and Cd are not easily vaporized.

The processes listed below are not analyzed in great detail, but are listed as likely to be useful in particular cases or applications where particular frequencies or other characteristics are desired.

TABLE 2

| Element | Metastable levels | Energy above ground, v. | Ionization potential, v. |
|---|---|---|---|
| Sn | | 2 | 7.3 |
| Pb | | 4 | 7.4 |
| Be, Mg, Ca, Sr, (Ba) | $n^3P_2, n^3P_0$ | | |
| Zn | $n^3P_2, n^3P_0$ | 4 | 9.39 |
| Cd | $n^3P_2, n^3P_0$ | 3.73 | 9.00 |
| Hg | $\begin{cases} 6^3P_2 \\ 6^3P_2 \end{cases}$ | $\begin{cases} 5.4 \\ 4.642 \end{cases}$ | 10.434 |
| He | $\begin{cases} 2'S^1 \\ 2^3S^1 \end{cases}$ | $\begin{cases} 20.55 \\ 19.77 \end{cases}$ | 24.581 |
| Ne | "$^3P_2$" | 16.53 | 21.559 |
| A | "$^3P_2$" | 11.49 | 15.75 |
| Kr | "$^3P_2$" | 9.8 | 13.996 |
| Xe | "$^3P_2$" | 8.30 | 12.127 |
| Rn | "$^3P_2$" | | 10.746 |
| Tl | $6^2P_{3/2}$ | 0.97 | 6.1 |

The case of the pure helium laser demonstrates that the lower level can be relaxed by inelastic collisions with atoms. At a pressure, $p_{He} \approx 10$ mm. Hg, the rate $\Gamma_{lt} > 3 \times 10^7$ sec$^{-1}$. Yet the lifetime of metastable or trapped levels in a plasma can exceed $10^{-4}$ seconds. This selectivity of atom-atom collisions in effecting transfers depends strongly on the change in binding energy, $\Delta E \equiv |E_a - E_b|$, which must be balanced by a change in kinetic energy. The phenomenon is not fully understood, but it is known that the cross-section in Equation 8 can be as large as $\sigma_{ba} \sim 10^{-15}$ cm.$^2$ only when $\Delta E \lesssim kT_g$, the average gas kinetic energy. A fast transfer rate is needed but without excessive back-collisions. In addition the population ratio $N_l/N_{reservoir}$ must be low if there is to be an inversion. Thus the limiting equilibrium Equations 2 and 3 seem to inconsistently call for an energy defect, $\Delta E \lesssim kT_g$. It is probable that this contradiction can be resolved only by a multistage collisional relaxation process. As with spontaneous relaxation, the introduction of extra levels below the lower laser level leads to a reduced excitation branching ratio. However, in compensation the quantum efficiency can readily exceed 50%. It is evident that the necessary conditions for high efficiency are not realized in the pure helium laser. The desirability of a multistage collision process strongly indicates a laser system where the lower laser level is not the ground level.

The relative amount of power wasted may be diminished in several ways according to the present invention. Selective population of the upper level (for example, by collisions of the second kind with metastables) is effectively combined with selective depopulation of the lower laser level. Effectiveness of such selective population is demonstrated, for example, in the increase by a factor of 20 for the rate of pumping neon atoms through the $\lambda = 1.15$ micron transition. At the optimum pressure ratio, direct excitation to the lower neon levels is still the primary energy sink. Nevertheless the He-Ne system has the highest efficiency reported for any gas laser (0.1%). The advantage of such forms of upper level population enhancement is combined with collisional relaxation, and such a "push-pull" inelastic collision system with two active components provides greatly improved efficiency.

Of course, the most selective mechanism for populating the upper level is the one first proposed historically: optical pumping. In principle, spontaneous emission from the lowest resonance level in the lamp can excite just the desired laser level. The problem then becomes one of properly matching emitter and absorber. Use of the broad absorption band characteristic of the photodissociation process is a step in this direction.

Because of the preponderance of lower energy electrons in the discharge, a reduction of losses from levels well below the lower laser level could greatly improve the excitation branching ratio. According to this invention a partially forbidden laser transition makes this possible.

A spontaneous emission rate, $A_{ul} < 10^4$ sec.$^{-1}$ would match minimum practical induced emission rate. A correspondingly slow relaxation process thereby suffices. This may be by a partially trapped radiative decay directly to the reservoir level (avoiding intermediate levels), or by inelastic collisions with other atoms (across small energy gaps).

A "forbidden" laser system which "almost" works is shown in FIG. 3. In a typical fluorescent lamp there is a state population in Hg($^3P_2$) of $\sim 10^{11}$ atoms/cm.$^3$ in excess of that in Hg($^3P_1$). The spontaneous magnetic dipole transition rate between these levels is $A_{ul} \sim 1$ sec.$^{-1}$. According to the equation $$\alpha \equiv \frac{1}{I}\frac{dI}{dz} = \left(N_u - \frac{g_u}{g_l}N_l\right)A_{ul}\frac{\lambda^3 \nu}{8\pi c \Delta \nu} \qquad (14)$$

where $\alpha$ is the gain coefficient, $I$ is the intensity, $dI/dz$ is the rate of change of intensity per unit length; "c" is the velocity of light; and $\Delta \nu$ is the spectral line width. The gain coefficient would be impractically small:

$$\alpha \sim 0.001 \text{ meter}^{-1}$$

This example illustrates two points: the ideal laser matrix element should have the intermediate value characteristic of a partially forbidden electric dipole transition to provide adequate gain; the laser levels should be close to the ground level to assure a favorable electron Boltzmann factor and a high population. If the ground level of mercury were ($6^3P_0$), the mercury metastable system would be operable.

The foregoing discussion suggests the new criteria for an efficient gas discharge laser according to the invention. The primary excitation of the atoms is by collisions with free electrons, while inelastic collisions between atoms both enhance the upper level population and relax the lower. Ideal characteristics (not fully realizable as a practical matter) of such a system are summarized below:

(A) The laser transition is slow (partially forbidden). For example it is an electric or magnetic dipole radiation transition in which one or more electric dipole selection rules is violated.

(B) The upper level is not depleted by inelastic atom-atom collisions ($E_u - E_l \gg kT_G$).

(C) All active levels have low energy to insure high population and high electron excitation rates. Preferably the upper laser level is below 25,000 wave numbers.

(D) The cross-section is large for collisional transfer between the laser levels and nearby levels (spacing $\Delta E \sim kT_G$).

(E) All levels with significant population facilitate funneling the atoms through the laser transition.

(F) The total energy defect, $\Sigma \Delta E$, in the series of inelastic transfers suffices to make $N_l < N_u$. A necessary condition is $$[e]^{-\Sigma \Delta E/kT_G} < [e]^{-(E_u - E_l)/kT_e} \qquad (15)$$

(G) The gas density is low enough to allow $T_e \gg T_G$, but large enough to insure inequalities. Therefore $$N \sim 3 \times 10^{17} \text{ atoms/cm.}^3$$

(H) Excitation of the upper level is indirect, via collisions of the second kind with a more populous atomic species having an isolated level (thus eliminating wasteful electron excitation of the lower levels).

Ideally suited atoms as outlined above do not exist, of course, but certain elements approximate the desired structure.

Figure 4:
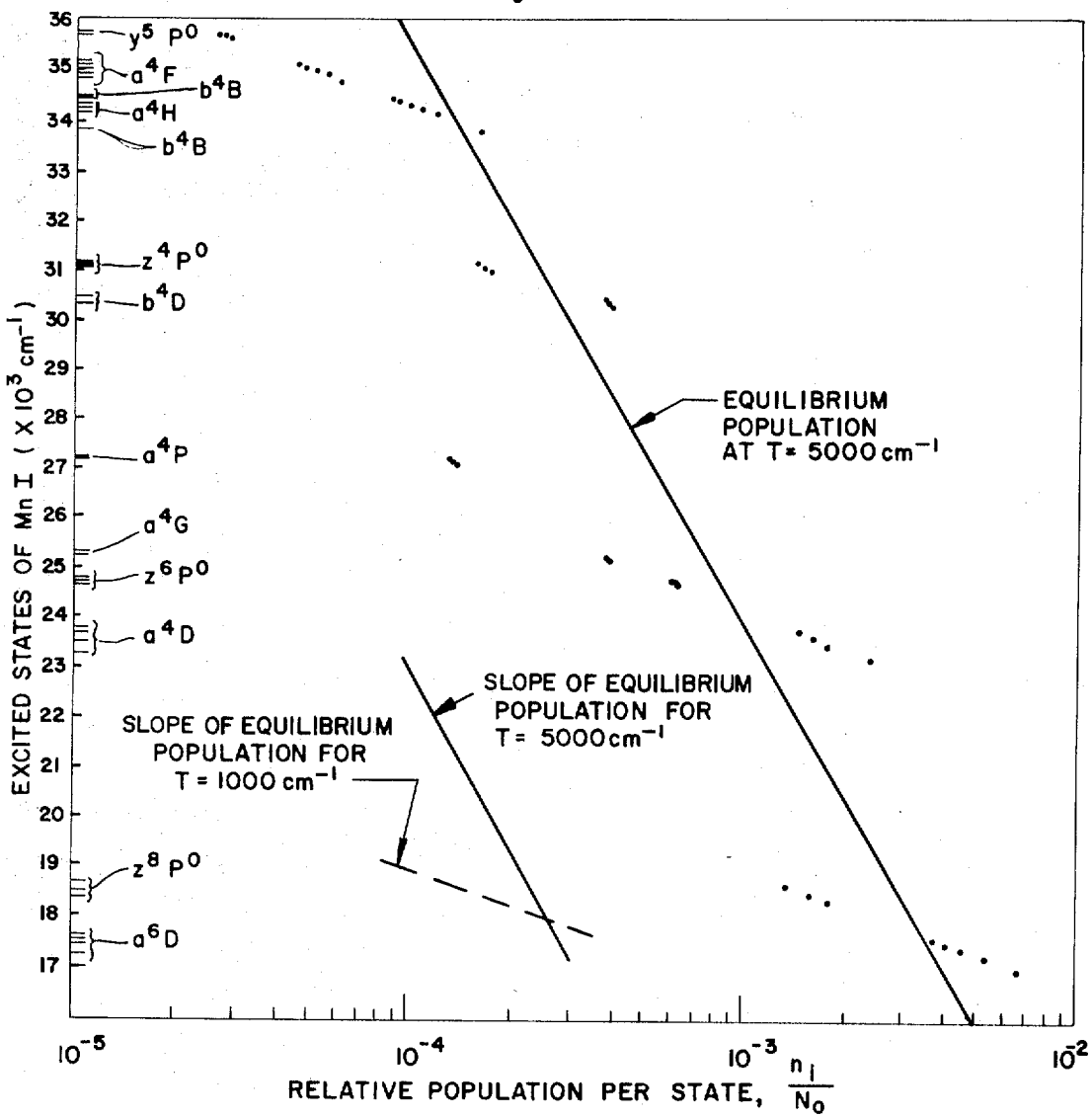
FIG. 4 is an energy level-population diagram showing typical populations of manganese I states under collision laser conditions useful in explaining the operation and advantages of a manganese laser according to the present invention.

The operation of a collision laser is exemplified by a manganese-noble gas system according to the invention. FIG. 4 shows the populations of the first 43 manganese levels computed for "reasonable" collision cross-sections and plasma parameters. There are four groups of closely spaced levels plus the single ground level [$a^6S_{5/2}$] (not shown). The populations within a group are primarily determined by inelastic collisions with the noble gas atoms in their ground state; the distribution is a good approximation to the Boltzmann distribution at the gas kinetic temperature (Equation 2). The average population of each group is primarily determined by inelastic collisions with electrons according to a Boltzmann distribution at the electron temperature. Several different population inversions are attainable, with laser transitions achievable between the following pairs of levels:

$$\left[a^4D \to Z^8P^0_{7/2} \atop 7/2\right]; \left[Z^4P^0 \to a^4P_{3/2} \atop 5/2\right]$$

The gain in the Mn $(a^4D_{7/2} \to Z^8P^0_{7/2})$ transition is, by calculation, $\alpha \sim 0.02$ meter$^{-1}$ with a population excess, $N_u = 10^{14}$ cm.$^{-3}$. The gain is small because the spontaneous emission coefficient, $A \sim 1$ sec.$^{-1}$, is that of a doubly forbidden intercombination electric dipole transition ($\Delta S = 2$).

The manganese atom would be close to ideal if the $[a^6D]$ term were the ground term. However, the smaller population of the lower excited states limits the achievable gain rather than the efficiency. Collisional relaxation does not require that the average population of the intermediate levels be less than that determined by the electron Boltzmann factor (Equation 2). Therefore, interchange with $[a^6S_{5/2}]$ ground term by electron collisions may be slow and almost conservative. Relaxation by diffusion to the walls will be still slower.

The rate at which metastables are attacked by admixed atoms will be at least 100 times faster than the diffusion rate to the walls and hence there will be practically no useless loss of metastables via this mechanism. Thus the efficiency of conversion will be relatively high. The discharge current must, of course, be sufficient to keep up the equilibrium population of metastables. The atoms will be primarily circulated among levels of the first five excited terms: ($a^6$D-reservoir), ($Z^8P^0$), ($a^4$D), ($Z^6P^0$), and ($a^4$G). The quantum efficiency is thus better than 50%; while the energy-weighted fraction of the electron excitations funneled through the oscillating laser transitions is (estimated)$\sim$20%. The induced power density should be on the order of $$P_L/V \simeq h\nu \times N(a^4D_{7/2}) \times \text{rate} \simeq 10^{-19} j \times 10^{14}$$
$$\text{cm.}^{-3} \times 10^5 \text{ sec.}^{-1} = 1 \text{ watt/cm.}^3 \quad (17)$$

$P_L/V$ is the power per unit volume; $j$ is energy in joules.

The amount of energy which can be stored in the upper level is much larger than in convention gas lasers. The energy density stored in the Mn($a^4$D) groups of levels will be $\sim 3 \times 10^{-5}$ joules/cm.$^3$. With a not unreasonable volume of $10^5$ cm.$^3$, coherent pulses of a joule or more are possible.

Both the efficiency and the power density of the manganese laser can be raised by a factor of 5 if Mn in the ($a^6$D) levels is selectively excited to the ($a^4$G) levels by collisions of the second kind with an appropriate admixed element. The two lowest levels of the lead atom are adapted for this purpose—separated as they are by 7,819 cm.$^{-1}$. Under these circumstances, the overall efficiency (Equation 7) may approach the quantum efficiency (right side of Equation 6). The closely spaced levels will be nearly in equilibrium with a heat bath at gas kinetic temperature, $T_g$, while the "pumping" atoms and the corresponding Mn levels are strongly coupled to a heat bath at the electron temperature, $T_e$. Thus the ultimate limit is the efficiency of an ideal heat engine, $$\text{eff.} < \frac{T_e - T_g}{T_e} \quad (18)$$

Substantial population inversion also can be generated by a discharge in a neon-lanthanum gas mixture. The $(Z^4F^0_{3/2}) \to (a^2P_{3/2})$ transition in particular, provides a high gain:

$$\alpha \gtrsim$$

Figure 5:
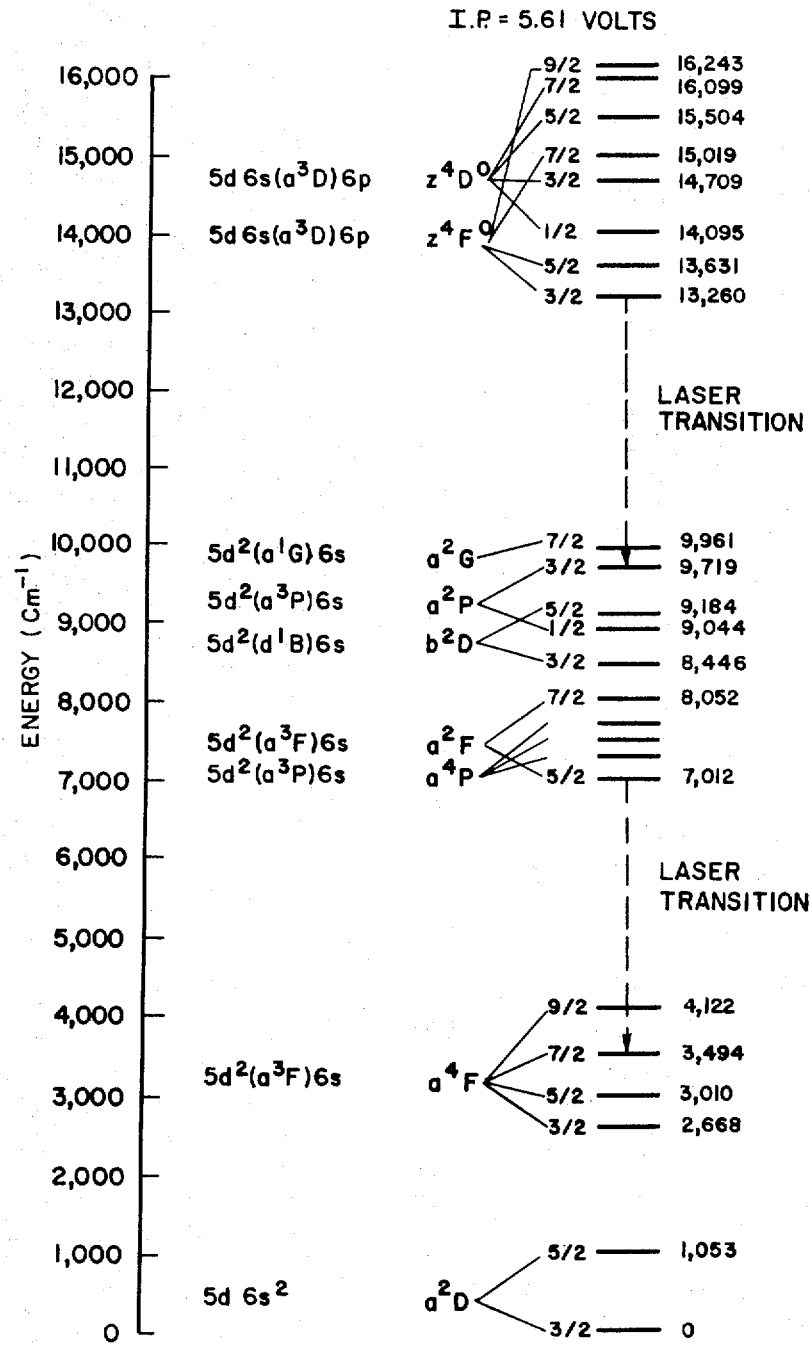
FIG. 5 is an energy level diagram of lanthanum useful in explaining the operation and advantages of a lanthanum laser according to the present invention.

0.1 cm.$^{-1}$ (see FIG. 5). The nearly ideal spontaneous emission rate, $A \approx 3 \times 10^4$ sec.$^{-1}$, is characteristic of a singly forbidden electric dipole. The fraction of atoms directly excited to the ($Z^4D^0$) and ($Z^4F^0$) terms will be meager. However, as in the manganese laser, efficient selective excitation by collisions of the second kind is desirable.

Unfortunately elements having appropriate energy levels with low-lying levels have partially filled shells, and tend to bond strongly, either to themselves or to other atoms. High temperatures are necessary to achieve a monatomic gas at pressure of a few torr. However present technological knowledge now makes feasible working temperatures as high as 2000° C. However, the higher the temperature the more sophisticated the apparatus must be.

A metal-to-alumina seal is available which is vacuum tight at 1500° C. A sealed-off alumina tube with sapphire windows can contain, for example, the alkalis, the alkaline earths, Al, Ga, In, Sn, Pb, Bi, I and Mn at $p=10$ torr, and a few other metals at lower pressures.

Still higher temperatures and more inert containers are required to vaporize most of the transition metals and the rare earths. Sc, Y, and La can be handled in tubes of the refractory metal, tantalum. However, no materials are transparent (in the infrared visible or ultraviolet) above 1500° C., except gases.

Thus in a preferred form of apparatus according to the invention, the windows are cool. The working substances, as well as outgassed impurities, gradually diffuse out of the hot central region through a noble buffer gas. A long working life for a laser of this type may be attained by simply increasing the load, or by recirculation of condensate by capillary action.

Figure 6:
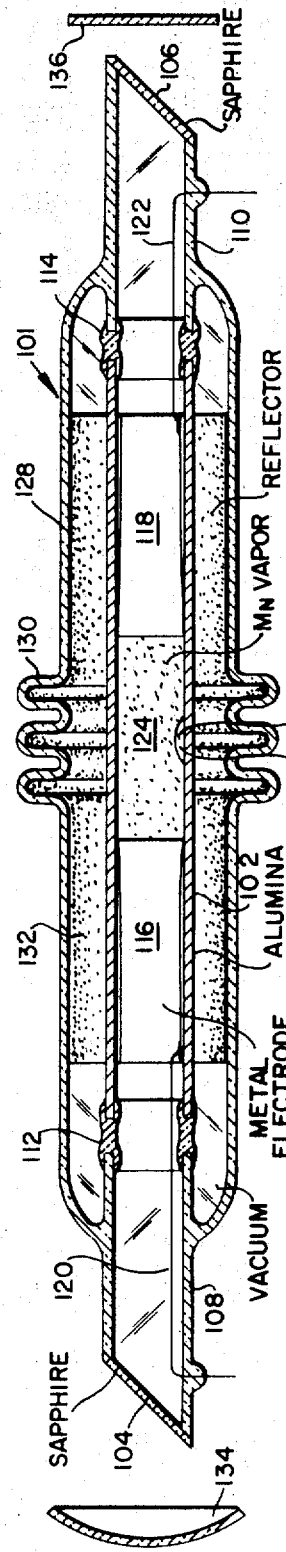
FIG. 6 is a high temperature laser apparatus for a manganese laser according to the present invention.

Referring now to FIG. 6, a laser apparatus is shown particularly adapted for a manganese laser according to the present invention. The laser apparatus 101 comprises a tube 102 formed of a material such as alumina which is resistant to high temperature and to corrosive action. The alumina tube 102 which is, naturally, opaque is provided with windows 104 and 106 preferably formed of sapphire.

The windows 104 and 106 are tilted at Brewster's angle to minimize losses at the windows.

The windows may most conveniently be sealed to a glass or quartz tube such as 108 and 110, the tubes 108 and 110 being in turn secured by suitable gas-tight seals 112 and 114 to the alumina tube 102.

Metal electrodes 116 and 118 are located near the ends of alumina tube 102. Electrodes 116 and 118 are connected to electrical leads 120 and 122 which may be led through the walls of tubes 108 and 110.

Accordingly there is provided an enclosure which is hermetically sealed and is formed in part by the high temperature tolerant alumina tube 102.

The enclosures described above is filled with a noble gas to act as a buffer between the hot innermost part of the tube and the cooler windows 104 and 106 and, in operation, as a buffer for manganese vapor 124 vaporized from a suitable reservoir of manganese 126.

In a preferred form of the invention there is admixed with the manganese, a quantity of lead and in operation the vapor includes both manganese and lead thereby enhancing the efficiency of the system by providing excitation of the manganese atoms by collisions of the second kind with the atoms of lead as previously explained.

It is contemplated that the electrical discharge between electrodes 116 and 118 which may preferably be a radio frequency discharge will provide enough heat energy to maintain the inner enclosure of the laser at the proper temperature to generate the desired vapor pressure in the manganese laser material. Of course auxiliary heating apparatus may readily be supplied to bring the enclosure up to its proper temperature or to maintain it at such temperature.

Means may be provided to conserve the heat generated in the laser and maintain it at proper temperature without avoidable waste of energy. For examle, a vacuum envelope comprising a jacket 128 encloses the alumina tube 102. The jacket 128 is provided with expansion bellows 130 and with a reflecting surface 132 to conserve radiant heat enregy.

It is apparent of course that the manner in which the heat of the central part of the laser enclosure comprising aluminum tube 102 is maintained is subject to variation and modification in accrodance with well known heating techniques.

The laser apparatus 101 may be provided with a suitable reflector system comprising for example a concave reflector 134 and a partially transparent flat reflector 136. As is well known, such a reflector system or resonator supplies the necessary regeneration for the laser apparatus to operate as an oscillator to generate coherent radiation. Other forms of reflector systems may be utilized in the laser apparatus and the particular form illustrated does not in itself form a part of the present invention.

The operation of the manganese laser illustrated in FIG. 6 has previously been explained from a quantum-mechanical point of view and such explanation will not be repeated. It may be noted however that the apparatus of FIG. 6 is especially adapted to permit the use of laser working media requiring a very high temperature for vaporization thereof. In particular the inclusion of a buffer gas and the remote position of the windows 104 and 106 avoids damage to the windows by exposure to high temperature or to the manganese vapor.

The manganese vapor will naturally condense in the cooler part of the enclosure (but for the most part before reaching the windows 104 and 106). Such manganese may either be replaced from the reservoir or, if desired, provision for recirculating the manganese may be provided in the form of numerous capillary tubes leading from the condensation area of the enclosure back to the high temperature portion near the manganese reservoir.

The apparatus of FIG. 6 provides a practical and satisfactory apparatus for high temperature lasers up to a temperature of approximately 1500° C.

Figure 7:
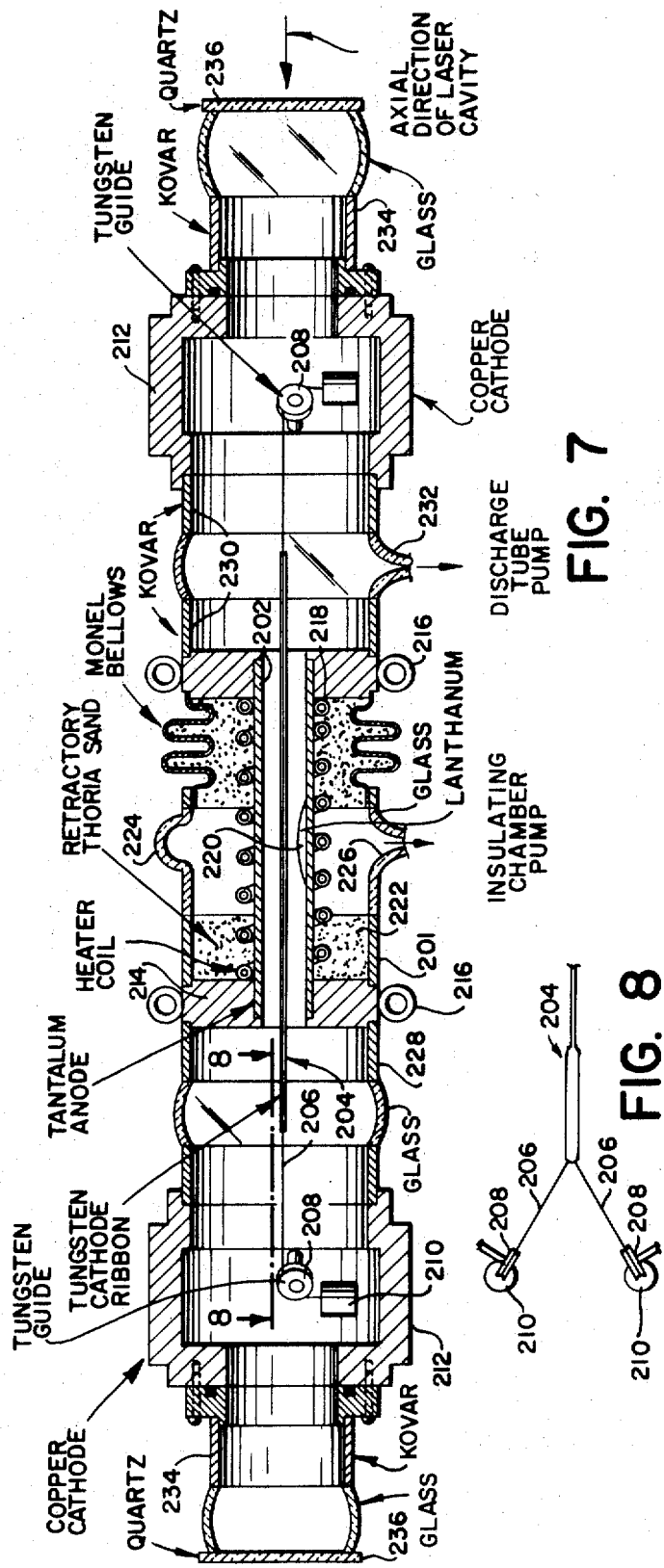
FIG. 7 is a high temperature laser apparatus for a lanthanum or yttrium laser according to the present invention.
Figure 8:
FIG. 8 is a fragmentary sectional view of the apparatus of FIG. 7 taken along the line 8—8 in FIG. 7.

A suitable apparatus ofr the still higher temperatures required in the case of laser materials such as lanthanum or yttrium is shown in FIGS. 7 and 8.

The operating temperature of the central portion of this apparatus will be approximately 1800° C. The laser apparatus 201 comprises an enclosure the central portion of which is formed by a refractory metal tube 202 made, for example, of tantalum.

The tantalum tube 202 provides the anode for a cross discharge, the cathode for the cross discharge comprising a tungsten ribbon 204.

As will be seen in FIG. 8, the ribbon 204 has a narrow central portion and wider end portion so that heating of the ribbon by virtue of the electrical current flow therein is largely confined to the portion of the ribbon within the tantalum tube 202. The cathode ribbon 204 is preferably supported in a manner which minimizes obscuration of the laser beam path. An illustrative form of support is best seen in FIG. 8 wherein it will be seen that each end of the ribbon cathode 204 is secured to a pair of conductive wires 206 which are in turn led over guide elements 208 and secured at their other ends to weights 210. Guides 208 are conductively connected to copper cathodes 212 so that a electrical connection may readily be established from the external portion of copper cathodes 212 to the cathode ribbon 204.

An electrical connection is also provided to the tantalum anode 202 through copper anode supports 214. Water cooled anode leads of conductive tubing 216 are provided in view of the high temperature prevailing at the anode and anode supports.

Suitable means may be provided for heating the central portion of the enclosure to the required high temperature such as a heater coil 218. Alternatively the tantalum tube itself may comprise the resistance element for electrically heating the enclosure. The laser material such as lantha-num (or as an alternative yttrium) is placed in the central high temperature portion of the enclosure at 220 as in the case of the manganese laser previously described. The enclosure preferably also contains a noble gas as a buffer and, if desired, a secondary medium for selective excitation of the lanthanum atoms by collisions of the second kind.

An insulation section for the laser 201 is provided which comprises an insulating material such as refractory thoria sand 222 enclosed by a Kovar metal, glass, and monel bellows cylinder. The bellows accommodates differences in expansion of the materials in a conventional manner and glass portions 224 and 226 provide for egress respectively of electrical heater leads and gases evacuated by a pumping system to maintain a vacuum and enhance the insulating properties of the body of thoria sand.

Electrical insulation between the anode and cathode rings of the apparatus is provided by Kovar-glass cylinder sections 228 and 230. A discharge outlet for evacuating and controlling the pressure in the enclosure may be provided at 232.

Copper to Kovar to glass transistions 234 are provided on the ends of the apparatus in order that windows 236 of quartz or the like may be provided. The windows of the apparatus of FIG. 7 may alternatively be Brewster angle and/or sapphire windows as illustrated in FIG. 6.

Reflectors of the type illustrated in FIG. 6 may be also provided for the apparatus of FIG. 7 if it is desired to utilize the apparatus for the reproduction of regenerative oscillations rather than merely for amplification.

The quantum-mechanical aspects of the lanthanum laser of FIG. 7 having been already described will not be repeated. The other advantages of the apparatus of FIG. 7 include most of those of the apparatus of FIG. 6 in addition to which it has a higher temperature operation capability. The cross discharge makes it possible to use the metal tube which has of course a higher temperature tolerance. It should also be noted that the lanthanum vapor coats the tungsten ribbon cathode enhancing the electron emission therefrom and contributing to the efficiency of operation of the device.

Modifications in addition to those suggested and other variations with respect to the present invention will be apparent to those of skill in the art. Accordingly, it is desired that the scope of the present invention not be limited to those variations and modifications suggested but that it be defined by reference to the appended claims.

This application is a division of the copending application of Gordon Gould, U.S. application Ser. No. 426,082 for "Laser Utilizing Collision Depopulation" filed on Jan. 18, 1965.

What is claimed is:

1. Laser apparatus for intensification of light radiation comprising a bounded volume containing a laser working medium in the form of an atomic gas, means for directing such radiation to be intensified through said volume, said medium having a pair of energy levels differing in energy by an amount corresponding to a light radiation frequency, the upper level and lower level of said pair of levels defining a radiative transition partially forbidden by at least one electric dipole selection rule, said lower level having nearby levels with which the cross section for collisional transfer is large, said lower level being relaxed by collisions with atoms of the same gas in nearby levels, and means for exciting said medium to produce a population inversion with respect to said pair of levels.

2. Laser apparatus as claimed in claim 1 wherein said upper level is below 25,000 wave numbers.

3. Laser apparatus as claimed in claim 1 further including means for causing radiation to repetitively traverse said bounded volume to produce a regenerative oscillation at said electromagnetic radiation frequency.

4. Laser apparatus as claimed in claim 1 wherein said laser working medium is a substance having a vaporization temperature of over 500° C.

5. Laser apparatus as claimed in claim 1 wherein said upper level has nearby levels with which the cross section for collisional transfer is large.

6. Apparatus as claimed in claim 1 wherein the energy difference between said pair of levels is much greater than the thermal energy of said gas and the upper one of said levels is not depleted by inelastic atom-atom collisions.

7. Apparatus as claimed in claim 1, wherein the means for exciting said medium is an electrical discharge in said gas and the density of said gas is sufficiently low that the thermal energy of the electrons in said discharge is much greater than the thermal energy of said gas.

References Cited
UNITED STATES PATENTS
3,183,937   5/1965   Earley et al. _____ 331—94.5

RONALD L. WIBERT, Primary Examiner

R. J. WEBSTER, Assistant Examiner

U.S. Cl. X.R.

330—4.3